United States Patent [19]

Sahatjian et al.

[11] 3,837,532

[45] Sept. 24, 1974

[54] AUTOMATIC SPRAY DISPENSER WITH INTEGRATED TEST APPARATUS

[76] Inventors: Edward Sahatjian, 98 Cedar St., Lexington, Mass. 02173; Gottfried Maurer, 281 Country Way, Needham, Mass. 02192

[22] Filed: July 16, 1973

[21] Appl. No.: 379,373

[52] U.S. Cl. .................................................. 222/70
[51] Int. Cl. ............................................. B67d 5/28
[58] Field of Search ........ 222/70, 76; 315/150, 156, 315/157, 158, 159

[56] References Cited
UNITED STATES PATENTS
3,007,080   10/1961   Benson ........................... 315/157 X

*Primary Examiner*—Stanley H. Tollberg

[57] ABSTRACT

Automatic aerosol spray apparatus which contains an aerosol container with a mechanically actuated spray valve, includes a drive motor for driving a mechanism which actuates the valve at regular intervals each initiated by a relatively brief motor drive cycle during which the motor is energized first through a timer circuit and then through a motor drive switch is improved by light actuated testing apparatus integrated therewith. The testing apparatus includes a light actuated photocell which procudes an electrical output for controlling a test switch electrically connected in parallel with the motor drive switch so that the spray apparatus is tested by illuminating the photocell causing the motor to drive through a cycle and actuate the aerosol spray. In a preferred embodiment, the apparatus is energized by a battery and a battery test circuit is connected to the battery and also to a battery test indicator which is activated by the test switch. Thus, by illuminating the photocell, the spray apparatus is actuated and the battery test indicator is operated for observation.

10 Claims, 2 Drawing Figures

PATENTED SEP 24 1974

3,837,532

AUTOMATIC SPRAY DISPENSER WITH INTEGRATED TEST APPARATUS

BACKGROUND OF THE INVENTION

The present invention relates to automatic spray dispensers for regularly releasing a burst of spray from an aerosol container and more particularly, to such a dispenser which is battery operated and adapted for periodic replacement of the aerosol container.

Heretofore, aerosol spray dispensers have been provided for regularly dispensing bursts of spray. The spray may be selected to provide a pleasant smell, to deodorize or to dispense a germicidal medicinal material into the surrounding area. These dispensers disperse the materials in spray form within an enclosed area such as public rest rooms, restaurants, hospital sick rooms and in other busy areas. In a typical use, a burst of spray is released from the aerosol container every 10 to 15 minutes and so 100 to 200 spray bursts are delivered during a day. Since the capacity of a large size aerosol can is several thousand bursts, the can must be replaced with a full can every few weeks. Of course, more frequent replacement is required where the bursts of spray occur more frequently and/or relatively small aerosol cans are used.

Where the spray dispenser is located in a public place, it is important that it be located beyond the reach of the passer by so that it cannot be easily tampered with. However, the dispenser should be monitored frequently to see that it is working and of course, periodically the aerosol can has to be replaced with a full can. Furthermore, where the dispenser is battery operated, it is desirable to check the battery and replace it if it does not test satisfactory.

Heretofore, the battery operated spray dispensers for releasing regular bursts of spray from an aerosol container have been serviced by an attendant who would periodically retrieve the dispenser from its out-of-reach location, replace the aerosol can with a full can, test the batteries, actuate the spray mechanism to see that it works and then return the dispenser to its out-of-reach location. Clearly, this procedure is time consuming and unless the spray interval in precisely known, it oftens occurs that either the aerosol can will be empty sometime before it is replaced or it will be replaced while containing a substantial amount of the material. Also, where the interval between bursts of spray is on the order of fifteen minutes or so, the monitor can not simply observe operation of the dispenser to ascertain that it is working except by observing it for fifteen minutes and this, of course, wastes alot of time.

SUMMARY OF THE INVENTION

In accordance with a preferred embodiment of the present invention, an automatic aerosol spray dispenser which is preferably battery driven is provided with a light actuated test system so that the monitor need only direct a flashlight beam to a photocell in the test system to initiate tests which reveal that the mechanism is or is not functioning, that the battery has or does not have sufficient life for continued operation and that the container is or is not near empty. These conditions are revealed to the monitor by indicators which are part of the test system and which he can view. Thus, these tests can be quickly made and the results obtained by the monitor who does not have to physically reach the dispenser or remove it from its remote location. Furthermore, the tests can be made by the monitor immediately and he does not have to wait while the dispenser goes through a cycle such as a relatively long fifteen minute cycle.

The dispenser includes a drive motor and a mechanism that actuates the aerosol can valve at regular intervals each initiated by a brief motor drive cycle during which the motor is energized to release a burst of spray from the can. During the motor drive cycle, the motor is energized first through a timer circuit that establishes the interval between bursts of spray and then the motor is energized through a motor drive switch. The integrated test apparatus includes a light actuated photocell that the monitor can illuminate with a flashlight and which produces an electrical output for controlling a test switch that is electrically connected in parallel with the motor drive switch. Thus, when the photocell is illuminated, the test switch closes and remains closed as long as the photocell is illuminated and so the monitor need only direct his flashlight beam to the photocell to energize the motor long enough for the motor to complete a drive cycle. Since the drive cycle typically takes only a few seconds, this is accomplished very quickly and if the mechanism is working correctly, the monitor will observe a burst of spray from the dispenser.

The test apparatus also includes a battery test circuit connected to the battery and controlling a battery indicator light which can be energized by the test circuit when the same test switch is closed by the output of the photocell. Thus, by the simple action of directing a flashlight beam to a photocell on the remotely located dispenser, the monitor can quickly check the actuating mechanism and the batteries in the dispenser.

In accordance with another feature of the present invention, the integrated test apparatus includes a counter driven by the motor. When the counter reaches a given count, it closes a count switch that energizes another light indicator, the container indicator. The count number at which the counter switch closes is pre-set in view of the size of the can and the amount of material dispensed with each spray burst. For example, it may be set to turn on the container light when 90 percent of the contents of the can have been dispensed.

The container indicator light when energized causes a continual drain on the battery. This drain can be minimized by using a flashing light and flasher control such that the container light flashes only with sufficient frequency to attract the attention of the monitor.

It is a primary object of the present invention to provide integrated remotely actuated test apparatus for an automatic spray dispenser.

It is a further object to provide such apparatus whereby a monitor can remotely quickly test the dispenser actuating mechanism and need not wait while the dispenser goes through a complete spray interval.

It is another object of the present invention to provide integrated with an automatic spray dispenser a remotely controlled battery tester for testing and revealing the condition of the batteries in the dispenser.

It is a further object in conjunction with the foregoing objects to provide means for remotely testing the dispenser actuating mechanism and batteries simultaneously following a simple interrogating action by a monitor.

It is another object to provide means integrated with an automatic spray dispenser mechanism for revealing the degree of emptiness of the aerosol container therein.

Other objects and features of the present invention will be apparent in view of the description of the embodiments of the invention taken in conjunction with the accompanying drawings.

DESCRIPTION OF EMBODIMENTS OF THE INVENTION

Figure 1:
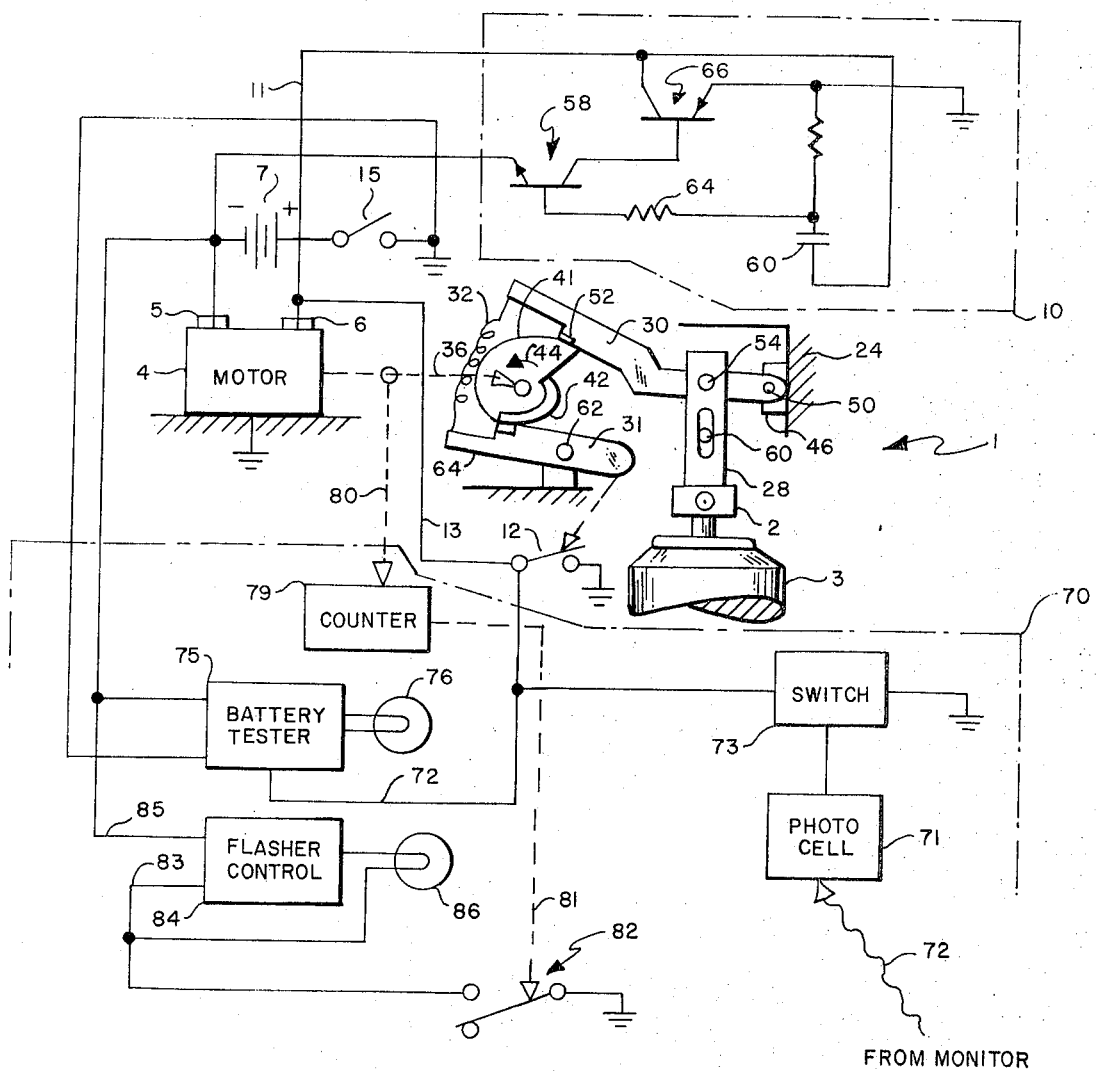
FIG. 1 is an electro-mechanical diagram of a suitable automatic spray dispenser having integrated therewith, test apparatus in accordance with the present invention, the actuating mechanism of the dispenser being shown at a position during the motor drive cycle just before a burst of spray is released.

Referring first to FIG. 1 there is shown a portion of a typical battery powered automatic spray dispenser. The parts of a conventional spray dispenser which are shown in this figure include the actuator mechanism 1 which mechanically actuates the metering valve 2 on an aerosol container 3. This actuating mechanism is substantially the same as the mechanism described in U.S. Pat. No. 3,584,766 entitled "Spray Dispenser Having A Capaciter Discharge Timer," which issued June 15, 1971 to C.M. Hart, et al. The actuating mechanism 1 is driven by a battery powered motor 4 having two input terminals 5 and 6. Terminal 5 is connected directly to the negative terminal of battery 7 and terminal 6 of the motor connects to the timer circuit 10 via line 11 and also connects to the motor switch 12 via line 13. Thus, the motor is energized either through line 11 or line 13 when the system is operative. The system becomes operative when the switch 15 is closed connecting the positive terminal of the battery to ground. Both the timer circuit 10 and the motor switch 12 connect to ground and so either of these can apply ground potential or substantially ground potential to terminal 6 of the motor to energize the motor.

The valve actuating mechanism 1 and the timer circuit 10 may be constructed and operate substantially as described in the above mentioned U.S. Pat. No. 3,584,766. The dispenser housing 22 supports an aerosol can or container 24 having a metering valve 25 at the top end of the can. The valve 15 is engaged by the actuator mechanism 1 having the actuator 28 continuously engaging the valve. The primary lever 30 is operative on the actuator 28 to operate the valve and a secondary lever 31 operates the motor switch 12. A tension spring 32 urges the arms 30 and 31 toward one another and the motor 4 drives a cam arrangement 38 coupled to the motor drive shaft 36. Primary and secondary cam surfaces 40 and 42 of the cam arrangement engage the primary and secondary arms 30 and 31, respectively to affect a periodic actuation and release of the aerosol container valve 25.

The cams 40 and 42 lightly engage the arms 30 and 31 and each cam includes an abrupt drop-off point for allowing the associated arm to suddenly move inward toward the drive shaft 36 and so the cams initially move the arms from each other until the cam falls are encountered by the arms at which time both arms move rapidly inward. The primary arm 30 pivots at bracket 46 attached to the housing by rivet 50. The free end of this arm includes a flange 52 engaging the cam surface 40 and in addition, the arm is pivotally secured to the upper end of actuator 28 by rivet 54 so that upward movement of the actuator is accomplished when the primary lever pivots clockwise. In its motion, the actuator 28 may slide in a vertical track attached to the housing and the actuator is retained in position in the track by rivet 60 that is attached to the housing and on which the actuator slides.

The secondary arm 31 pivots on rivet 62 attached to the housing and one extremity of this arm includes the flange 64 riding on cam 42.

Figure 2:
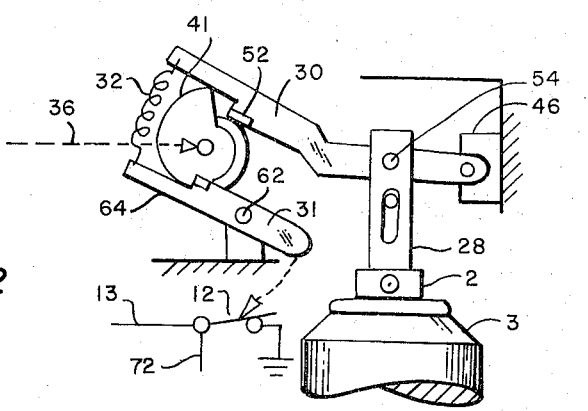
FIG. 2 illustrates the same actuating mechanism during the motor drive cycle immediately following release of a burst of spray from the aerosol container as an aid to understanding the functioning of the complete system.

In operation, the bias of the spring 32 is much stronger than the metering valve spring. Thus, when the motor drive shaft 36 rotates cam 38 in the direction of arrow 49, the flange 52 of arm 30 abruptly drops off cam 40 at step 41, while flange 64 of arm 31 is still riding on cam 42. As a result, arm 30 abruptly and quickly drives the actuator 28 downward to depress the spray valve 2 releasing a burst of spray from the aerosol container. As rotation of the cam 38 continues, very shortly after release of the spray, flange 64 of arm 31 falls off of cam 42 causing the arm 31 to pivot clockwise closing switch 12. At this point in the motor drive cycle, the actuator mechanism 1 appears as shown in FIG. 2 and the motor is energized via switch 12. Up to this point in the drive cycle, the motor was energized via the timer circuit 10. The motor continues driving in the direction of arrow 49 until the actuator mechanism is again in the position shown in FIG. 1 with the motor switch 12 open. By this time, the timer circuit 10 will have recharged and will no longer energize the motor via line 11 and so the motor will stop having completed a drive cycle.

The drive cycle just described is initiated by the timer circuit 10. This timer circuit is an electronic RC time constant unit which may have selectable units to provide spray release intervals of 15, 30, or 60 minutes. When the time interval has elapsed, the capacitance in the timer circuit trips a mono-stable transistor which in turn actuates another transistor which acts as a control switch for the motor coupling the motor terminal 6 to ground via line 11. The motor then runs until the drive cycle is completed. In the timer, transistor 58 is controlled by the charge on timing capacitor 60 in an RC circuit consisting of the timing resistor 62, capacitor 60, current limiting resistor 64 and the transistor 58. This transistor acts as a blocking oscillator or monostable transistor and controls the switching transistor 66 that connects line 11 to ground when it conducts. Transistor 74 thus functions as an over driven amplifier in that it goes from cut-off to a full conduction and so operates as a switch.

In operation, while capacitor 60 holds sufficient charge, neither of the transistors 58 or 66 are conducting and since the actuator mechanism 1 is in the position shown in FIG. 1, there is no energy to the motor. This is the condition just following a spray burst when the motor drives the actuator to the position shown in FIG. 2. During the interval, charge leaks from the capacitor 60 through resistor 64 and transistor 58 at a rate depending upon the time constant RC of the circuit. As mentioned, this time constant may be 15, 30, or 60 minutes and establishes the interval between bursts of spray.

When the capacitor 60 is sufficiently discharged, transistor 58 is turned on and it turns on the switching transistor 66 which connects terminal 6 of the motor to ground via line 11 energizing the motor. Thereafter, the motor drive cycle, is as already described.

The particular embodiments of the present invention shown in FIG. 1 consists of the test apparatus 70 which is integrated with the mechanism and circuits of the dispenser actuator 1, timer circuit 10 and the motor and battery circuits. The testing apparatus 70 is intended for quick, remote monitoring of the dispenser to check the actuation, the state of the battery and the amount of spray material left in the aerosol container. Testing of the actuation and the state of the battery are initiated by the monitor simultaneously. The testing apparatus which accomodates this includes a photocell sensor 71 that responds to light 72 produced by for example, a flashlight operated by the monitor. The sensor produces an output which actuates electronic switch 73 so that the switch closes connecting line 74 to ground and since this line connects directly to line 13, the motor terminal 6 is connected to ground energizing the motor. Thus, by illuminating the photocell sensor 71 with light from a flashlight, the monitor causes the motor to be energized and so initiates a motor drive cycle even while the timer circuit 10 is shut off and does not energize the motor via line 11. Thus, the monitor can witness actuation of the spray dispenser immediately and he does not have to await a full spray interval to do this.

The battery tester circuit 75 measures the battery voltage across a load in comparison with voltage regulated by a Zener diode in the tester. Thus, the batter tester is connected across the battery terminals when switch 15, the dispenser on-off switch, is turned on. If the battery voltage is higher than the regulated voltage, the battery indicator lamp 76 lights up provided that line 77 from the tester to line 74 is grounded. Conversely, if the battery voltage is lower than the regulated voltage, the lamp 76 does not light. Here again, illumination of the photocell sensor 71 closes switch 73 applying ground to line 77 to reveal the voltage state of the battery.

The testing circuit 70 may also include a counter 79 driven from the motor drive shaft 36 via mechanical coupling 80. The counter may have a count capacity of any number of counts, for example, 6,000 and it can be pre-set to any number of counts from 0 to 6,000. As soon as the counter has reached its pre-set count, a mechanical output 81 from the counter closes counter switch 82 which applies ground potential to one input 83 of flasher control circuit 84. The other input 85 of circuit 84 connects to the negative terminal of the battery. The output of the flasher control circuit connects to one terminal of the container indicating lamp 86 and the other terminal of the lamp connects to line 83. Thus, when the pre-set count is reached, switch 82 is closed and the container indicator lamp 86 flashes on and off revealing to the monitor the relative amount of material left in the aerosol container. The flasher control circuit may be a bi-stable transistor unit which drives the lamp 86. This intermittent action reduces the battery power consumption and at the same time makes the signal more conspicuous to the monitor.

The embodiment of the present invention described herein represents the best known use of the invention. It includes a test circuit or test system integrated with a known conventional automatic, battery operated aerosol spray dispenser. This test circuit greatly facilitates monitoring the dispenser because the monitor can check the operation of the dispenser, the state of the battery and the contents of the aerosol container very quickly from the remote location by simpling shining a flashlight on the dispenser and observing the reaction. The construction, operation and use of this test circuit is described herein, integrated with a known conventional dispenser by way of illustration rather than limitation. It should be clearly understood that the testing apparatus circuits and method described herein can be adapted readily in whole or in part for other spray dispensers having a different actuating mechanisms and-/or timer controls deviating from the spirit and scope of the invention, as set forth in the appended claims.

What is claimed is:

1. In automatic spray apparatus for use with an aerosol container having a metering valve mechanism which includes a spray valve moveable to an operative position to release a spray burst of material from the container at regular intervals an electrical motor drive for cyclically moving the spray valve to the operative position, a source of electrical energy for the drive motor, a motor switch actuated by the motor drive for coupling the source to the motor during a portion of the motor drive cycle and a timer for controlling energization of the motor, means for testing said apparatus comprising, a light actuated photocell producing an electrical output, and
   a test switch in parallel with the motor switch controlled by the photocell output,
   whereby illumination of the photocell causes the motor to drive through a cycle moving the spray valve to the operative position.

2. Automatic spray apparatus as in claim 1 wherein, the photocell output causes the test switch to close, energizing the motor for so long as the photocell is illuminated.

3. Automatic spray apparatus as in claim 1 wherein, the motor drive cycle is a fraction of the regular interval,
   the motor is energized through the motor switch during a fraction of the motor drive cycle, and
   the motor is energized through the timer circuit during a fraction of the motor drive cycle.

4. Automatic spray apparatus as in claim 3 wherein, testing by illuminating the photocell can be commenced before or after a motor drive cycle.

5. Automatic spray apparatus as in claim 4 wherein, the timer operation schedules the regular intervals and the motor drive cycles, and
   said timer schedules are not altered by said testing.

6. Automatic spray apparatus as in claim 1 wherein, the source is a battery,
the motor has two input terminals,
one terminal of the battery connects directly to one terminal of the motor,
the other terminal of the battery connects to a common voltage point, and
the test switch connects the other terminal of the motor to the common voltage point when the photocell is illuminated.

7. Automatic spray apparatus as in claim 6 wherein, the other terminal of the motor connects to the common voltage point through the motor switch or through the test switch or through the timer circuit.

8. Automatic spray apparatus as in claim 1 wherein, at least part of the apparatus is contained in a housing and the other terminal of the battery is grounded to the housing,
whereby the motor is energized by connection of the other terminal thereof to ground through the motor switch or the test switch or through the timer circuit.

9. Automatic spray apparatus as in claim 1 wherein, the source is a battery,
the motor test circuit is electrically coupled to the battery,
a battery test indicator is coupled to the battery test circuit, and
energization of the battery test indicator is controlled by the test switch.

10. Automatic spray apparatus as in claim 9 and further including, a counter driven by the motor for counting motor drive cycles, and
a container indicator coupled to the output of the counter,
whereby the container indicator is actuated when a pre-determined number of motor drive cycles are counted.

* * * * *